M. WOLFF.
COMBINED STAY AND HOOK AND EYELET.
APPLICATION FILED OCT. 7, 1913.

1,112,105.  Patented Sept. 29, 1914.

Witnesses:
P. G. Schmitz

Inventor:
Margaret Wolff
By Arthur L. Slee
HER ATTY.

UNITED STATES PATENT OFFICE.

MARGARET WOLFF, OF SAN FRANCISCO, CALIFORNIA.

COMBINED STAY AND HOOK AND EYELET.

1,112,105.  Specification of Letters Patent.  Patented Sept. 29, 1914.

Application filed October 7, 1913. Serial No. 793,937.

*To all whom it may concern:*

Be it known that I, MARGARET WOLFF, a subject of the Grand Duchess of Luxemburg, residing in the city and county of San Francisco and State of California, have invented a new and useful Improvement in Combined Stays and Hooks and Eyelets, of which the following is a specification.

My invention relates to a resilient or flexible stay composed of a continuous wire formed into a series of hooks and eyelets to be used in fastening wearing apparel of a light or flimsy texture and the objects of my invention are, first, to provide an improved hook and eyelet strip or stay that is adapted to act as a support and fastening for net collars and the like; second, to provide means whereby hooks in one portion of the stay will register in their proper consecutive order with the eyelets in the other stay; third, to provide a hook and eyelet stay that shall be light of construction and sufficiently rigid to prevent gaping between the hooks should one set of opposite hooks and eyelets be inadvertently or otherwise left unhooked; and fourth, to provide a stay composed of a series of hooks adapted to engage a series of eyelets that shall be resilient, compact and inconspicuous when the said stay is secured to the collar or garment.

For a full and clear comprehension of the device reference should be had to the drawings forming a part of the present specification wherein like numerals of reference designate similar parts throughout the said specification and drawing, and in which—

Figure 1:
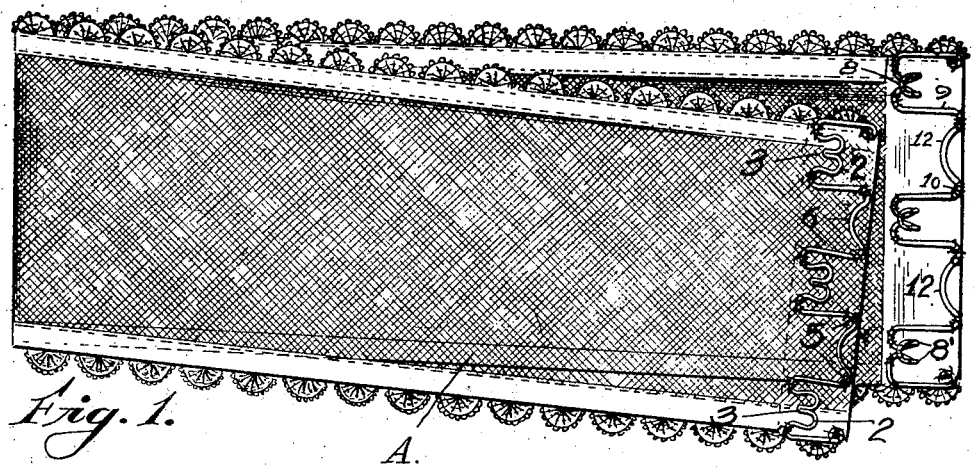
Figure 2:
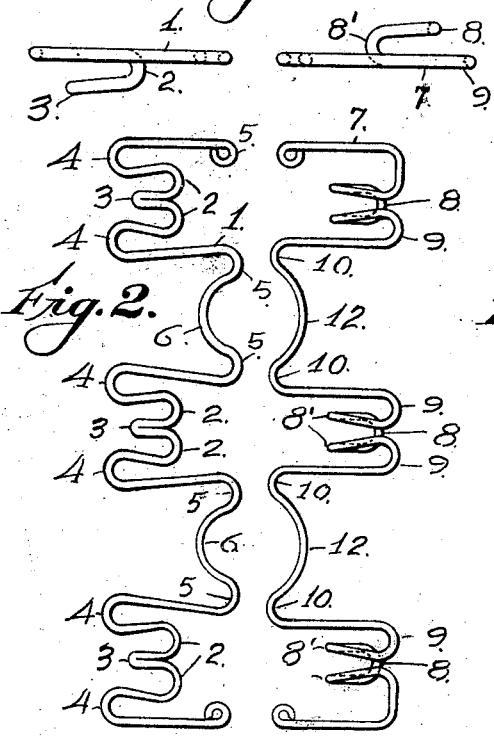
Figure 3:
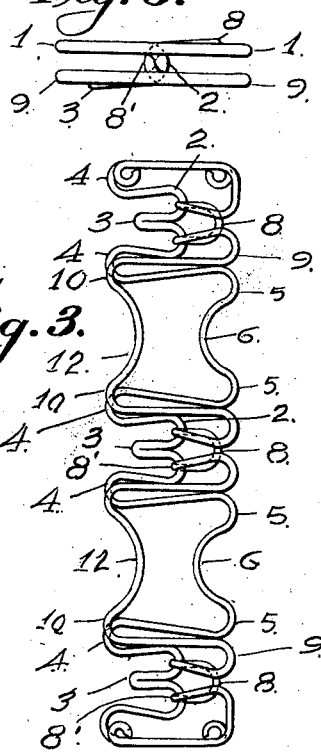
Figure 4:
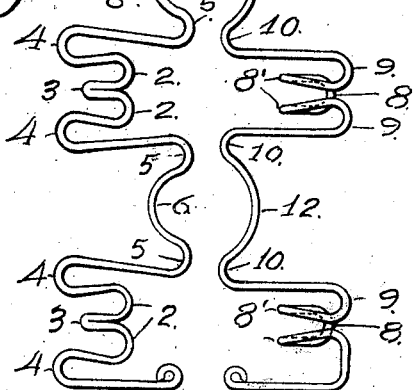
Figure 5:
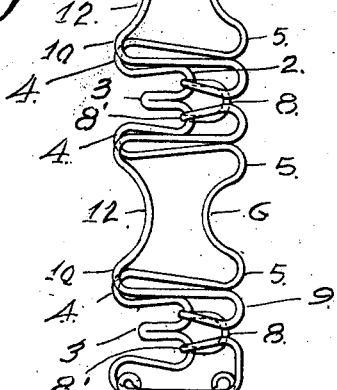

Figure 1 is a view of a net collar disclosing the improved hook and eyelet stays secured thereto. Fig. 2 is an enlarged view of the hook and eyelet stays removed from the collar and in their relative positions before being hooked together. Fig. 3 is a view similar to Fig. 2 but disclosing the hook and eyelets stay hooked together. Fig. 4 is a greatly enlarged top view of Fig. 2, and Fig. 5 is a greatly enlarged view of Fig. 3 disclosing the manner in which the hook of one stay engages the eyelet of the other stay.

This device is to be used for the support and fastening of net collars and the like, and other garments of like texture that are not sufficiently rigid to stand alone or without support. It is also to be used for fastening a guimpe or similar garment of light texture for the purpose of retaining the same in place and also for preventing gaping between the hooks and eyelets.

Referring to the drawings the numeral 1 is used to designate a continuous wire bent to form a series of seats 2, hooks 3 and stitching eyelets 4. Each portion comprising the seats 2, a hook 3 and the stitching eyelets 4 is connected to a similar portion by means of the arcuate connection 6 which portion is further provided with other stitching eyelets 5 at the junction of said connection 6 with the said portions. The eyelet strip is likewise formed of a continuous wire bent to form the eyelets 8, having the seats 8' for the reception and engagement of the seats 2 of the hooks 3, and the stitching eyelets 9, each portion comprising the eyelets 8, seats 8' and stitching eyelets 9, being connected to a similar portion by means of the arcuate connection 12, which connection also forms stitching eyelets 10 between the said portions and at the junction of the connections 12 with the said portions. The connections 6 and 12 also form means for supporting the edges of the garment between the hooks for the purpose of preventing that portion of the fabric from gaping.

When the strips or stays are placed in their proper relative positions, as indicated in Fig. 2 of the drawings, it will be observed that the hooks 3 and the seats 2 thereof are directly opposite the eyelets 8 and seats 8' thereof, respectively. When the first eyelet 8 is hooked over the first hook 3 in such a manner that the seats 8' will engage the seats 2, as illustrated in Fig. 3 of the drawings, the second eyelet 8 will be directly opposite the second hook 3 for the reason that the distances between the hooks of one strip and the eyelets of the other strip are substantially the same. The distances between the hooks are maintained by means of the connections 6 while the distances between the eyelets 8 are maintained by the connections 12. In this manner the engagement of the second hook 3 with the third or fourth, or any other, eyelet 8, except the second or corresponding eyelet, is prevented. Consequently no gaping can result by reason of the wrong hook 3 being engaged by the wrong eyelet 8, such as frequently occurs where separate hooks and eyelets are used. The connections 6 and 12 also serve as gages for the purpose of placing the eyelets 8 directly opposite the corresponding hooks 3.

Should the engagement on any particular hook 3 with its corresponding or opposite eyelet 8 be inadvertently omitted that space will be prevented from gaping by means of the connections 6 and 12 to which the edges of the collar or garment is secured by means of the stitching eyelets 5 and 10, respectively.

When the strips are attached to a guimpe or similar garment which is fastened at the back it is evident that the hooks 3 can be easily secured to the corresponding eyelets 8 and that it will be impossible, owing to the continuous nature of the strips or stays, to engage any hook with any other than its opposite or corresponding eyelet. Also the continuous nature of the hook and eyelet strips will act as a resilient stay and retain the edges of the garment in a smooth and even condition. The resiliency is imparted to the strips by reason of the several undulations between the hooks on the one strip and the eyelets on the other strip so that no uncomfortable stiffness or rigidity will be experienced by the wearer. Also the resiliency so imparted to the stays or strips will permit the stay to readily conform to any normal movement of the body or neck and return to a normal position with the body.

It is obvious from the foregoing that I have provided a stay composed of hooks and eyelets that will facilitate the engagement of each hook with its proper eyelet and thus prevent gaping. Also a light resilient stay that is adapted to support and retain in proper position any collar or guimpe of light texture. It is also evident that I have provided means for preventing a gap in the edges of the garment when the engagement of any hook with its corresponding eyelet has been omitted.

The details of construction being so susceptible to variation I do not wish to confine myself to the precise construction shown herein but rather to avail myself of any modification that may fall properly within the scope of my invention.

Having thus described my invention what I claim as new and desire to secure by Letters Patent is—

1. A stay consisting of a pair of continuous wire members each of which is formed to have inturned right angular ends formed with stitching eyelets, each member also having spaced intermediate longitudinal portions which aline with the free extremities of the right angular ends and are laterally arched, one of the members having two ends and an intermediate pair of spaced seats and a hook which spaces the seats, the seats and hooks being connected by said longitudinal portions and the other member having two end and an intermediate pair of seats to engage the respective first named seats and also having eyelets to receive the hooks, said longitudinal portions when the members are connected extending along the outer longitudinal sides of the respective opposite members, and stitching eyelets on opposite sides of each hook and each eyelet located at the outer longitudinal sides of the members.

2. A stay consisting of a pair of continuous wire members the ends of each of which are turned inwardly and formed with sewing eyes, a series of spaced hooks formed on one member and located adjacent to the outer longitudinal side thereof and a series of corresponding spaced eyes formed on the other member and located adjacent to the outer longitudinal side of same, and a series of longitudinal connecting portions for the eyes and for the hooks which connecting portions are located adjacent to the inner longitudinal sides of the members whereby when the members are secured together the connecting portions of one member will extend across the space between the hooks or eyes of the other member.

In witness whereof I hereunto set my signature in the presence of two subscribing witnesses.

MARGARET WOLFF.

Witnesses:
KARL F. SCHULTZ,
JAMES F. McCUE.